(12) United States Patent
Kato et al.

(10) Patent No.: US 8,815,365 B2
(45) Date of Patent: Aug. 26, 2014

(54) CARBON FIBER STRUCTURE AND METHOD FOR MANUFACTURING THE SAME

(75) Inventors: Hideki Kato, Ogaki (JP); Haruhide Shikano, Ogaki (JP); Tomoyuki Ando, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 349 days.

(21) Appl. No.: 13/198,684

(22) Filed: Aug. 4, 2011

(65) Prior Publication Data
US 2012/0034415 A1 Feb. 9, 2012

(30) Foreign Application Priority Data
Aug. 4, 2010 (JP) .................. 2010-174966

(51) Int. Cl.
*B32B 5/12* (2006.01)
*D01F 9/12* (2006.01)
*C04B 35/83* (2006.01)
*B32B 18/00* (2006.01)
*D21H 13/50* (2006.01)

(52) U.S. Cl.
CPC .......... *D21H 13/50* (2013.01); *C04B 2235/616* (2013.01); *C04B 2235/48* (2013.01); *C04B 2235/95* (2013.01); *C04B 35/83* (2013.01); *C04B 2235/652* (2013.01); *B32B 18/00* (2013.01); *C04B 2235/5268* (2013.01); *C04B 2235/526* (2013.01); *C04B 2237/385* (2013.01); *C04B 2235/6028* (2013.01); *C04B 2235/77* (2013.01); *C04B 2235/5264* (2013.01); *C04B 2235/96* (2013.01); *C04B 2235/94* (2013.01)
USPC ..... 428/98; 428/298.1; 428/299.1; 428/301.4

(58) Field of Classification Search
USPC .................. 428/114, 98, 298.1, 299.1, 301.4
See application file for complete search history.

(56) References Cited

U.S. PATENT DOCUMENTS

| | | | |
|---|---|---|---|
| 4,759,977 A * | 7/1988 | Fukuda et al. | 442/111 |
| 5,705,106 A | 1/1998 | Kolesnikov et al. | |
| 5,871,838 A | 2/1999 | Klett et al. | |
| 2004/0155382 A1 | 8/2004 | Huang et al. | |
| 2008/0254296 A1 | 10/2008 | Handa et al. | |
| 2010/0292069 A1 | 11/2010 | Ichikawa et al. | |

FOREIGN PATENT DOCUMENTS

| | | |
|---|---|---|
| CN | 1946655 | 4/2007 |
| CN | 101146937 | 3/2008 |
| EP | 1748036 | 1/2007 |
| EP | 1878816 | 1/2008 |

(Continued)

OTHER PUBLICATIONS

English translation of Chinese Office Action for corresponding CN Application No. 201110222443.1, Dec. 12, 2012.

(Continued)

*Primary Examiner* — Brent O'Hern
(74) *Attorney, Agent, or Firm* — Mori & Ward, LLP

(57) ABSTRACT

A carbon fiber structure and a manufacturing method of the same are provided. The carbon fiber structure includes a carbon fiber-reinforced carbon composite material having carbon fibers and a carbonaceous matrix. The carbon fibers are configured by a substantially linear fiber. The carbon fibers form thin piece bodies in which a longitudinal direction of the carbon fibers is oriented in parallel to a surface direction of the carbon fiber structure within the carbonaceous matrix. The carbon fiber structure is configured by a laminate having the thin piece bodies laminated therein.

15 Claims, 13 Drawing Sheets

(56) References Cited

FOREIGN PATENT DOCUMENTS

| | | |
|---|---|---|
| GB | 2182918 | 5/1987 |
| JP | 62-007520 | 1/1987 |
| JP | 04-016331 | 1/1992 |
| JP | 05-043320 | 2/1993 |
| JP | 06-135770 | 5/1994 |
| JP | 8-302038 | 11/1996 |
| JP | 10-130067 | 5/1998 |
| JP | 10-152391 | 6/1998 |
| JP | 11-060373 | 3/1999 |
| JP | 2000-143360 | 5/2000 |
| JP | 2002-036381 | 2/2002 |
| JP | 2002-068851 | 3/2002 |
| JP | 2002-097082 | 4/2002 |
| JP | 2003-212673 | 7/2003 |
| JP | 2011-093758 | 5/2011 |
| JP | 2012-036018 | 2/2012 |
| TW | 377337 | 12/1999 |
| TW | 2005-10153 | 3/2005 |

OTHER PUBLICATIONS

Extended European Search Report for corresponding EP Application No. 11176551.7-2124, Oct. 31, 2011.

Japanese Office Action for corresponding JP Application No. 2010-174966, Jan. 21, 2014.

Taiwanese Office Action for corresponding TW Application No. 100127510, Dec. 4, 2013.

* cited by examiner

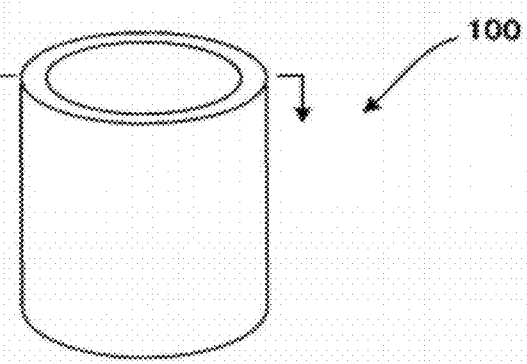
FIG. 1A
FIG. 1B 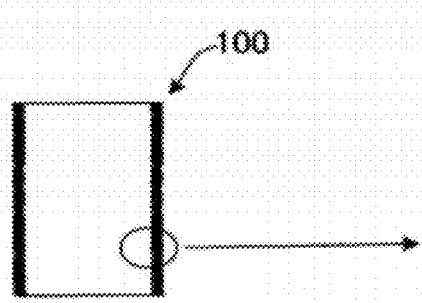 FIG. 1C 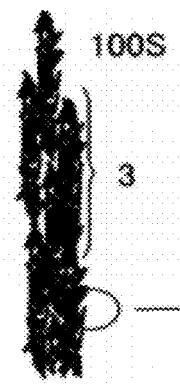 FIG. 1D 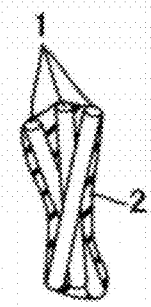

FIG. 3A1
FIG. 3A2

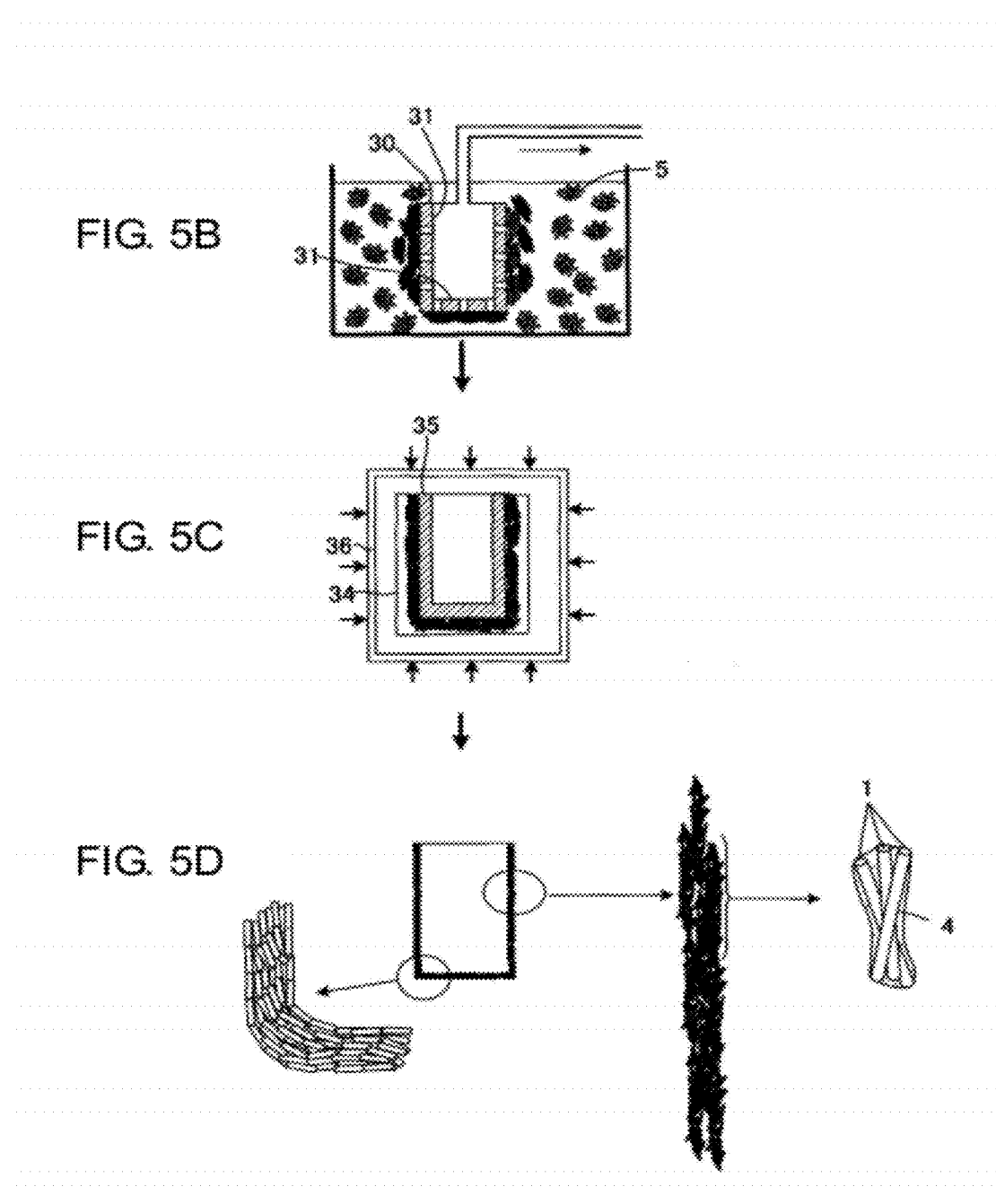

2cm

2cm

1cm

1cm

1cm

——— 500 μm

— 100 μm

— 100 μm

— 10 μm

— 100 μm

——— 100 μm

— 10 μm

125 μm

125 μm

CARBON FIBER STRUCTURE AND METHOD FOR MANUFACTURING THE SAME

CROSS-REFERENCE TO RELATED APPLICATION

This application claims priority from Japanese Patent Application No. 2010-174966, filed on Aug. 4, 2010, the entire subject matter of which is incorporated herein by reference.

BACKGROUND OF THE INVENTION

1. Field of the Invention

The present invention relates to a carbon fiber structure and a method for manufacturing the same.

2. Description of the Related Art

Since carbon fibers have high heat resistance and strength, they are used as a carbon fiber reinforced carbon composite material (C/C composite material) which includes the carbon fibers and a carbon matrix in various fields requiring heat resistance, chemical stability and strength. The C/C composite material includes various kinds depending upon a compositing method of carbon fibers, and various carbon fiber structures can be formed by using the same.

The C/C composite material is comprised of a matrix made of a carbide such as a pitch or a thermosetting rein, and carbon fibers. There are various C/C composite materials depending upon a fixing method of carbon fibers such as a cloth laminating method using a carbon fiber cloth, a filament winding method using carbon fiber filaments, a method using a carbon fiber felt, and a sheet-forming method using a carbon fiber sheet-formed body.

The cloth laminating method is a method of obtaining a C/C composite material by laminating a woven fabric made of carbon fibers, impregnating the woven fabric with a matrix precursor such as a pitch and a thermosetting resin, followed by curing and calcination (see JP-A-H11-60373). A C/C composite material in a plate form can be obtained by laminating planar woven fabrics and uniaxially pressing the laminate. Also, a C/C composite material in a complicated shape of the papier-mache form can be obtained by sticking small cut woven fabric pieces to a die in a three-dimensional shape. Furthermore, a C/C composite material in a cylindrical shape can also be obtained by a cloth winding method including winding a planar woven fabric in a roll form while applying a pressure thereto and laminating it.

The filament winding method is a method of obtaining a C/C composite material by winding a strand of carbon fibers around a mandrel while applying a tension thereto and then impregnating the wound strand with a matrix precursor such as a pitch and a thermosetting resin, followed by curing and calcination (see JP-A-H10-152391).

The method using a carbon fiber felt is a method of obtaining a C/C composite material by laminating long fibers of carbon fibers in a felt-like form and impregnating the laminate with a matrix precursor such as a pitch and a thermosetting resin, followed by curing and calcination (see JP-A-2000-143360). Similar to the cloth laminating method, according to this method, a planar C/C composite material, a cylindrical C/C composite material and a C/C composite material having a complicated shape can also be obtained. In particular, a cylindrical C/C composite material can also be obtained by sheet winding method including winding up a planar felt in a roll form while applying a pressure thereto, followed by lamination (See, for example, FIGS. 13A and 13B).

Furthermore, in a sheet-forming method, the C/C composite material is obtained by suspending carbon fibers in a liquid to form a slurry, dipping a suction die having an aperture in this slurry, allowing the liquid in the slurry to pass into a rear surface of the suction die and depositing carbon fibers on the surface side of this suction die to form a molded material, following by drying and calcination (see JP-A-2002-68851 and JP-A-2002-97082).

The disclosures of JP-A-H11-60373, JP-A-H10-152391, JP-A-2000-143360, JP-A-2002-68851 and JP-A-2002-97082 are incorporated herein by reference.

SUMMARY OF THE INVENTION

An embodiment of the present invention provides the following:

A carbon fiber structure comprising a carbon fiber-reinforced carbon composite material including carbon fibers and a carbonaceous matrix, wherein the carbon fibers are configured by a substantially linear fiber, wherein the carbon fibers form thin piece bodies in which a longitudinal direction of the carbon fibers is oriented in parallel to a surface direction of the carbon fiber structure within the carbonaceous matrix, and wherein the carbon fiber structure is configured by a laminate having the thin piece bodies laminated therein.

A manufacturing method of a carbon fiber structure comprising:

(A) suspending carbon fibers and a binder that is a precursor component of a carbonaceous matrix, in a liquid, and adding an aggregating agent to aggregate the carbon fibers and the binder, thereby forming flocks;

(B) filtering the liquid having the flocks formed therein by a die having a porous die face to laminate the flocks on a surface of the porous die face, thereby forming a laminate of the flocks;

(C) pressurizing the laminate of flocks and orienting a longitudinal direction of the carbon fibers in parallel to a surface direction of the porous die face to convert the flocks into thin pieces, thereby forming a laminate of thin piece body precursor; and (D) calcining the laminate of thin piece body precursor and carbonizing the binder to form a carbonaceous matrix, thereby forming a laminate of thin piece bodies.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 1A to 1D are views showing a structure of Embodiment 1, specifically, FIG. 1A is a perspective view; FIG. 1B is a sectional view; FIG. 1C is an enlarged view of a part of the sectional view of FIG. 1B; and FIG. 1D is a more enlarged view of a part of FIG. 1C;

FIGS. 3A1 to 3D are outline views showing a manufacturing method a structure of Embodiment 1;

FIG. 4A is a perspective view; FIG. 4B is a sectional view; FIG. 4C is an enlarged view of a part of the sectional view of FIG. 4B; and FIG. 4D is a more enlarged view of a part of FIG. 4C;

FIGS. 5B to 5D are outline views showing a manufacturing method of a structure of Embodiment 2;

FIG. 9A is a photograph with a magnification of 100; FIG. 9B is a photograph with a magnification of 200; and FIG. 9C is a photograph with a magnification of 500;

FIG. 10A is a photograph with a magnification of 100; FIG. 10B is a photograph with a magnification of 200; and FIG. 10C is a photograph with a magnification of 500;

FIG. 13A is a perspective view, and FIG. 13B is a sectional schematic view.

DETAILED DESCRIPTION

Figure 2:
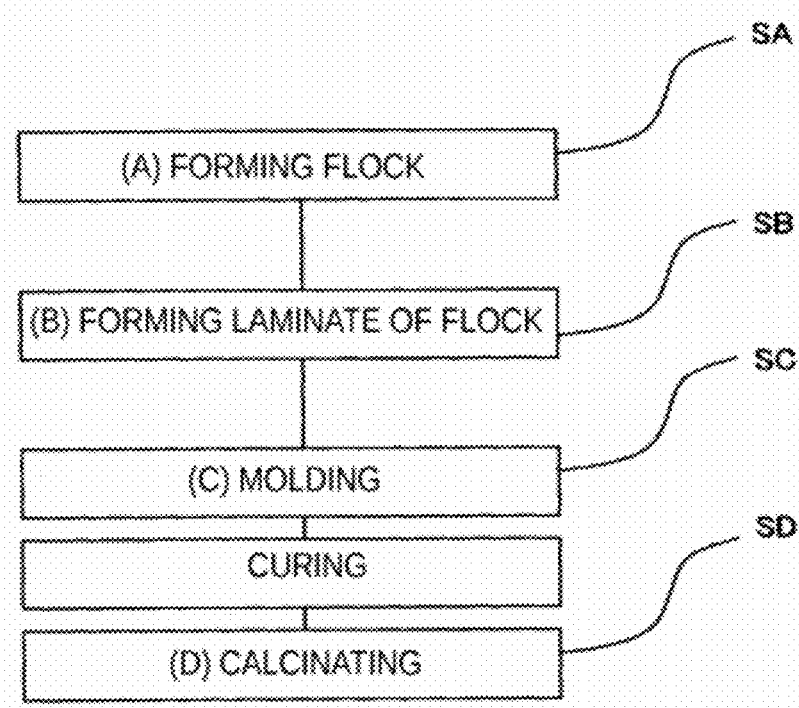
FIG. 2 is a step flow chart of a manufacturing method of a structure of Embodiment 1.

In the manufacture of a C/C composite material, in the case of manufacturing a simple C/C composite material in a plate form, ends of the plate material are opened. Therefore, even when shrinkage is caused in a process of pressing and calcination, only a size of the whole becomes small, and a C/C composite material which is low in warp or deformation can be obtained.

In the case of manufacturing a C/C composite material in a substantially plate form having a ring-like shape such as a substantially cylinder, the filament winding method or the cloth winding method is adopted. In these methods, for the purpose of revealing a high density, a preliminarily molded body is formed by winding a cloth or filaments around a core while applying a tension thereto. Since the molded body is manufactured according to such a method, a thin-walled C/C composite material can be easily manufactured. However, in the manufacture of a thick-walled C/C composite material, a tension is applied to the cloth or filaments, and there is no end at which a stress is released in a circumferential direction of the preliminarily molded body. Therefore, due to a difference in the tension between an outer layer side and an inner layer side of the preliminarily molded body, the inner layer side is considered as being easily buckled. Furthermore, a lowering of a bonding force is likely to occur due to the generation of shrinkage and carbonization of a binder component by calcination, whereby the inner layer side of the preliminarily molded body is more easily buckled. As a result, when the core is removed, the inner layer side of the preliminarily molded body is deformed by buckling, and a lowering of the strength occurs in its turn. For that reason, it may be considered as difficult to obtain a thick-walled C/C composite material by means of the filament winding method or cloth winding method.

Also, in the case of the method using a carbon fiber felt, several layers of a thin felt are laminated and molded. However, since a bonding force between the felts is small, separation is easy to occur. In particular, in the case of manufacturing a thick-walled C/C composite material, a compression stress is likely to be applied in a process of curing and calcination, and hence, when the core is removed, the inner layer side of the preliminarily molded body is easily buckled. That is, similar to the filament winding method and the cloth winding method, there is involved such a problem that deformation or a lowering of the strength occurs in the inner layer side of the preliminarily molded body due to buckling. For that reason, it may be considered as difficult to obtain a thick-walled C/C composite material by laminating carbon fiber felts.

Also, in the related-art manufacturing method of a C/C composite material, when warp or deformation is generated at a stage of curing and calcination of a preliminarily molded body, in the case where a dimensional tolerance in the product shape is small, or in the case where the product shape is not a simple shape such as a plate, it is necessary to perform processing such as cutting and joining.

However, in the filament winding method, the cloth winding method, the sheet winding method and so on, several layers of a filament, a cloth, a carbon fiber felt or the like are laminated to form a preliminarily molded body. Therefore, it may be considered that when the foregoing processing is performed, long fibers capable of keeping the strength are cut, the strength becomes partially weak, and separation is easy to occur between layers with weak strength.

Furthermore, in the sheet-forming method, a sheet-formed body that is preliminary molded body of the C/C composite material is formed like forming a paper sheet. In this method, it may be considered that at a stage where a thin sheet-formed body is formed, the hydraulic resistance of a liquid (water) including carbon fibers dispersed therein becomes larger, and therefore, the sheet-forming becomes difficult as the thickness of a layer becomes larger. Accordingly, in order to obtain a thick-walled C/C composite material, it is necessary to lower the density of carbon fibers to avoid the increase of hydraulic resistance of the liquid, and therefore, it may be considered as difficult to obtain high strength C/C composite material.

Illustrative embodiments of the present invention will be described by reference to the drawings.

The carbon fiber structure according to an embodiment of the present invention (hereinafter also referred to as "structure") is a molded body configured by a carbon fiber-reinforced carbon composite material including carbon fibers and a carbonaceous matrix. The carbon fibers are configured by a substantially linear fiber. The carbon fibers form thin piece bodies in which a longitudinal direction of the carbon fibers is oriented in parallel to a surface direction of the carbon fiber structure within the carbonaceous matrix. The carbon fiber structure is configured by a laminate having the thin piece bodies laminated therein.

(Embodiment 1)

A carbon fiber structure according to Embodiment 1 of the present invention is described by reference to FIGS. 1A to 1D.

FIG. 1A is a perspective view of a structure 100 of Embodiment 1. FIGS. 1B to 1D are a sectional view, an enlarged view of a part and a more enlarged view of the part of FIG. 1A, respectively. As shown in FIGS. 1C and 1D, in this structure 100, in a most number of carbon fibers 1, a longitudinal direction of those fibers is oriented substantially in parallel to a surface direction of the structure 100 within a carbonaceous matrix 2, whereby thin piece bodies (sheet-like small pieces) 3 are formed. The structure 100 is configured by a laminate of the thin piece bodies 3.

According to the above structure, the carbonaceous matrix 2 is filled and constituted so as to intervene between the carbon fibers 1 constituting the thin piece bodies 3, thereby fixing the carbon fibers each other. Furthermore, since the thin piece bodies 3 are laminated in such a manner that fallen leaves are piled up at random, the ends of the thin piece bodies are likely to be dispersed in many places of the inside of the carbon fiber structure. In other words, the thin piece bodies are disposed such that ends of the thin piece bodies adjoining in a laminating direction of the thin piece body to each other are deviated in the laminating direction. According to this, the ends of the thin piece bodies are not likely to overlap, so that a defect (boundary of the thin piece body) which is likely to be structurally weak, thereby causing separation or formation of a crack is likely to be finely dispersed. In the meantime, in the case where a large defect is present in one place, this large defect becomes a notch, thereby easily causing a lowering of the strength. On the other hand, when a defective portion is finely dispersed as in an embodiment of the present invention, a stress to be applied to the defective portion can be dispersed. For that reason, a carbon fiber structure which is apparently homogenous and free from a defect can be obtained. Since the carbon fiber structure according to an embodiment of the present invention has such a structure, a C/C composite material structure which is high in heat resistance and high in strength even at a high temperature can be obtained.

An average major axis diameter of the thin piece body is preferably from about 1 to about 10 mm, and more preferably from about 2 to about 5 mm. When the average major axis diameter of the thin piece body is 1 mm or more, since the size of the corresponding flock piece becomes separate from a length of the carbon fibers, the carbon fiber structure configured by the thin piece body is easily obtainable. On the other hand, when the average major axis diameter of the thin piece body is about 10 mm or less, in laminating a flock serving as a base of the thin piece body in a manufacturing step as described later, segregation hardly occur in a central part and a peripheral part of the flock, and therefore, a binder component in the inside of the thin piece body hardly causes segregation. Also, when the average major axis diameter of the thin piece body is about 10 mm or less, even when the binder is melted in subsequent molding and curing, the thin piece body can sufficiently flow, whereby the segregation is likely to be relieved. Therefore, it may be considered that the strength of the structure is hardly lowered.

An average thickness of the thin piece body is preferably from about 0.05 to about 1.0 mm, and more preferably from about 0.1 to about 0.5 mm. When the average thickness of the thin piece body is about 0.05 mm or more, the size of the corresponding flock becomes separate from the thickness of the carbon fiber, the carbon fiber structure configured by the thin piece body is easily obtainable. When the average thickness of the thin piece body is about 1.0 mm or less, a void is hardly formed in an end of the thin piece body, whereby it may be considered that the strength of the structure is hardly lowered.

As described later, the carbon fiber structure according to an embodiment of the present invention is formed by aggregating carbon fibers and a binder in a liquid to form flocks and laminating (sheet-forming) the flocks. The flock as referred to herein means an aggregate in which randomly oriented carbon fibers and a binder are substantially uniformly dispersed.

In an embodiment of the present invention, the carbon fibers 1 are composed of a substantially linear fiber. In view of the fact that the carbon fibers 1 are composed of a substantially linear fiber, in filtering the flocks using a die in a laminating step (at the time of sheet-forming) of flocks as described later, a substantially linear carbon fiber is likely to pierce the flock of a lower layer, which is already formed on the surface of the die, and is likely to be joined in a thickness direction. Therefore, a joining strength in a vertical direction (thickness direction) to the surface direction of the structure is easily obtainable. The "substantially linear fiber" as referred to in an embodiment of the present invention means a fiber which does not substantially have a bending part and is preferably an acicular fiber. In the case of using carbon fibers which hardly become a substantially linear fiber, such as carbon fibers having a long fiber length and soft carbon fibers, such a carbon fiber hardly pierces the already formed flock, and the longitudinal direction of almost all of the fibers is oriented along the surface direction of the structure. Therefore, the amount of the carbon fibers taking part in joining in the thickness direction becomes small, so that the joining strength in the thickness direction is hardly obtainable.

It is desirable that the structure according to an embodiment of the present invention contains a carbon fiber component connecting the thin piece bodies adjoining in the laminating direction of the thin piece body (thickness direction of the structure) to each other. Also, it is desirable that an orienting component in the thickness direction of the carbon fibers 1 is continuously present in the thickness direction of the structure. As described above, flocks containing a substantially linear fiber are laminated in such a manner that the linear carbon fiber pierces the already formed flock, and hence, the orienting component of the carbon fiber in the thickness direction is likely to be also continuously formed at a boundary between the flocks. According to this, a hardly separable C/C composite material structure which does not have an interface in a vertical direction to the thickness direction of the structure can be obtained.

An average fiber length of the carbon fibers is desirably less than about 1.0 mm. When the average fiber length of the carbon fibers is about 1.0 mm or more, fibers get tangled together and repel each other at the time of flock laminating, so that a laminate of flocks (sheet-formed body of flocks) with a high bulk density is hardly obtainable. In order to increase the bulk density, it is desirable to perform compression molding on the laminate of flocks is low using an autoclave or the like. In the case where the bulk density of a laminate of flocks is low, when compression molding is performed, the larger a difference in the bulk density before and after the compression, the higher a compressibility is, a wrinkle is generated in a compression process, and in particular, a corner part is easily lined with wrinkles, and a defect is likely to increase. When such a defect increases, a portion with low strength is likely to be generated in the corner part. When the average fiber length of the carbon fibers is less than about 1.0 mm, at lamination of flocks, a laminate of flocks with a higher bulk density can be obtained, and hence, the compressibility can be made low in undergoing compression molding using an autoclave. According to this, the generation of a wrinkle in the corner part or the like can be suppressed, whereby a C/C composite material structure with a less defect can be obtained.

Furthermore, when the average fiber length of the carbon fibers is about 1.0 mm or more, the carbon fibers are easily bent, and the longitudinal direction of the carbon fibers is oriented substantially in parallel to the surface direction of the structure at the time of laminating flocks. For that reason, tangling among fibers in the thickness direction is few, and separation is easy to occur. On the other hand, when the average fiber length of the carbon fibers is less than about 1.0 mm, the carbon fibers are easy to become a substantially linear fiber and easy to pierce the already formed flock of a lower layer, and the joining strength in the thickness direction of the structure is easily obtainable.

The average fiber length of the carbon fibers is desirably in the range of about 0.05 mm or more and less than about 0.5 mm. When the average fiber length of the carbon fibers is about 0.5 mm or less, not only the strength in the thickness direction of the carbon fiber-reinforced carbon composite material structure can be more increased, but since short fibers are easily filled in a high density, the density at the time of laminating flocks can be increased, and the compressibility at the time of molding can be increased as the repulsive force of the fibers is smaller. When the average fiber length of the carbon fibers is about 0.05 mm or more, an effect of the carbon fibers reinforcing the matrix can be obtained easily and the property as the fibers is hardly lost, and therefore, a structure with high strength is likely to be obtainable.

An average fiber diameter of the carbon fibers is preferably from about 1 to about 20 μm. Also, an aspect ratio of the carbon fibers is preferably from about 10 to about 1,000. When the average fiber diameter and the aspect ratio of the carbon fibers fall within the foregoing ranges, respectively, the fiber diameter can be made sufficiently thin relative to the fiber length, and the fibers are hardly drawn out from the matrix, and hence, high strength is likely to be obtainable.

As the carbon fibers, any of a pitch based carbon fiber or a PAN based carbon fiber can be suitably used. Since the PAN based carbon fiber is low in elastic modulus as compared with the pitch based carbon fiber, it can be suitably used for applications requiring flexibility, for example, a crucible for single crystal pull-up apparatus, a heat insulating cylinder, a crucible receptacle, a heater, etc. Since the pitch based carbon fiber is high in elastic modulus as compared with the PAN based carbon fiber, it can be suitably used for structural members of machine parts in which it is intended to suppress flexion, such as a liquid crystal support plate and a conveying arm.

The structure according to an embodiment of the present invention preferably has a bulk density of about 1.2 g/cm$^3$ or more. When the bulk density of the structure is about 1.2 g/cm$^3$ or more, since a void of the C/C composite material is likely to be few, joining among the carbon fibers by the matrix becomes dense, and the carbon fibers hardly leave. For that reason, a dense C/C composite material with higher strength can be obtained.

In the structure according to an embodiment of the present invention, even in the case of a curved C/C composite material having a thickness of about 20 mm or more, a C/C composite material with high strength can be easily formed. Since flocks containing carbon fibers and a binder are once formed and then deposited in a die by means of a sheet-forming method, thereby molding a preliminarily molded body that is a laminate of flocks, a thick-walled preliminarily molded body is easily obtainable, and a C/C composite material structure having a wall thickness of about 20 mm or more is easily obtainable.

The manufacturing method of the structure according to an embodiment of the present invention is hereunder described. FIG. 2 is a flow chart of manufacturing steps of the structure according to an embodiment of the present invention; and FIGS. 3A1 to 3D are outline views showing a manufacturing method of the structure.

1. Step (A): Flock forming step SA

First of all, as shown in FIG. 2 and FIGS. 3A1 to 3A2, the carbon fibers 1 and a binder that is a precursor component of a carbonaceous matrix are suspended in a liquid, and thereafter, an aggregating agent is added to aggregate the carbon fibers 1 and the binder, thereby forming flocks 5. As shown in FIG. 3A1, the carbon fibers 1 are first dispersed in a liquid to form a slurry, and as shown in FIG. 3A2, the slurry is then aggregated with a lapse of time, thereby forming the flocks 5.

2. Step (B): Step SB of forming a laminate of flocks

Subsequently, as shown in of FIG. 2 and FIG. 3B, the liquid having the flocks 5 formed therein is filtered by the die 20 having the porous die face 21. The porous die face 21 has a large number of openings 21A on a side surface thereof. According to this, the flocks 5 are laminated on the surface of the porous die face 21 as a layer continuing in the surface direction of the porous die face 21, thereby forming a laminate 50 of flocks.

Different from a conventional technique of direct filtration (sheet-forming) of a slurry having carbon fibers suspended therein, the manufacturing method according to an embodiment of the present invention is characterized in that the carbon fibers are once aggregated together with the binder to form flocks, which are then filtered (formed). According to this, even when lamination of the flocks 5 onto the porous die face 21 proceeds, the liquid is able to permeate between the flocks 5, and therefore, the thick laminate 50 of flocks which hardly blocks the permeation of the liquid is easily obtainable. Also, as shown an enlarged view of FIG. 3B, even in the case of making the average fiber length of the carbon fibers 1 smaller than the openings 21A of the porous die face 21 for the purpose of making the passing resistance of water small, the flocks 5 can be formed larger than the opening 21A. In consequence, the laminate 50 of flocks can be formed without allowing the carbon fibers 1 to pass through the opening 21A at the time of filtration.

3. Step (C): Step SC of Molding a Laminate of Thin Piece Body Precursor

Subsequently, as shown FIG. 2 and FIG. 3C, the laminate 50 of flocks is pressurized. According to this, the longitudinal direction of the carbon fibers 1 is oriented in parallel to the surface direction of the porous die face 21. Then, the flocks 5 are converted into a thin piece, thereby forming a thin piece body precursor 6 as shown in FIG. 3D. In this way, a laminate 60 of thin piece body precursor is formed.

4. Step (D): Calcination Step SD

Figures 3B, 3C, 3D:
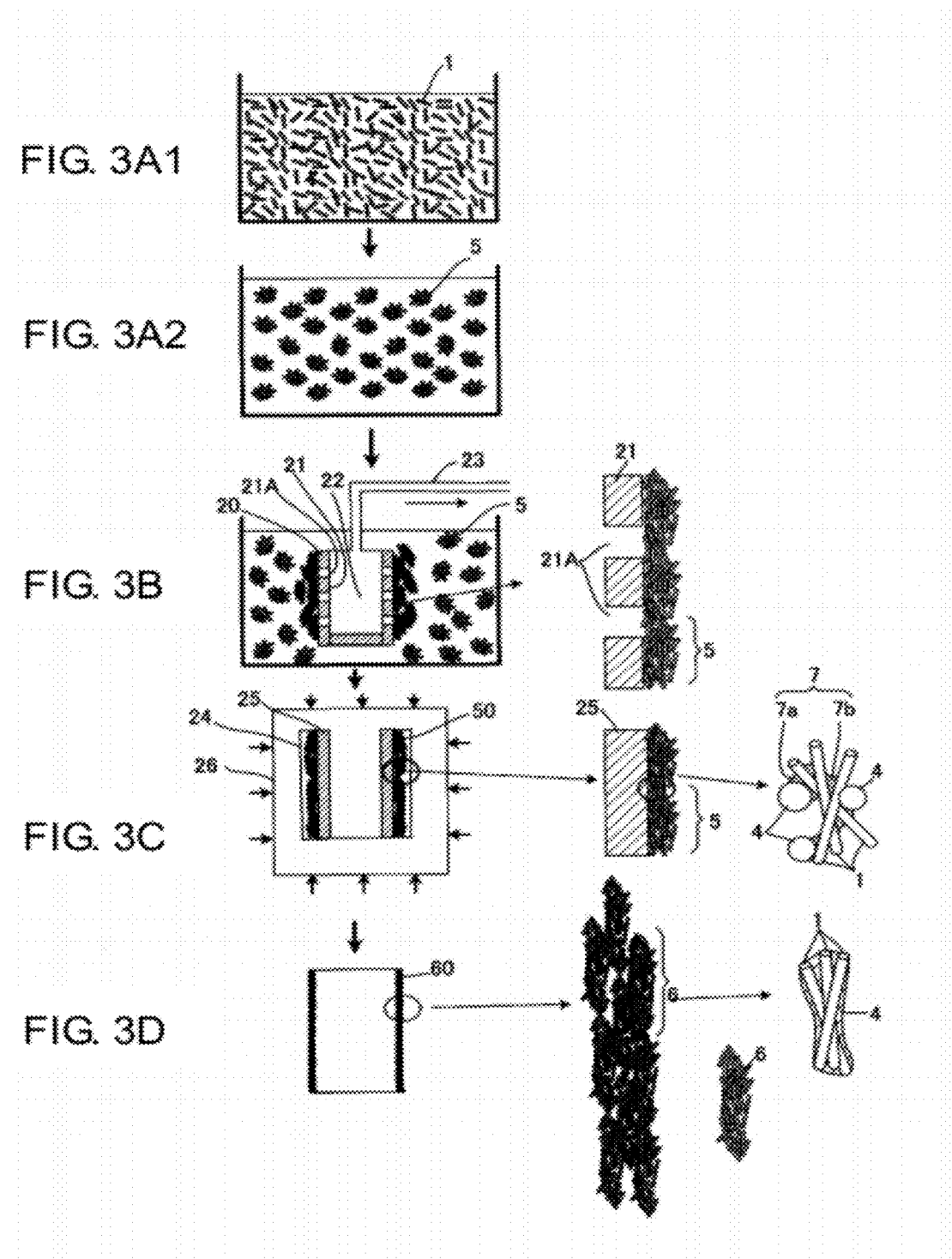

Then, as shown in FIG. 2 and FIG. 3D, the laminate 60 of thin piece body precursor is calcined. According to this, a binder 4 is carbonized to form the carbonaceous matrix 2 as shown in FIG. 1D, whereby the laminate 60 of thin piece body precursor becomes the thin piece body 3. In this way, a laminate of the thin piece bodies 3, namely the structure 100 according to an embodiment of the present invention, is obtained.

Next, each of the steps is hereunder described in more detail.

[Regulation of carbon fiber]

It is preferable that the carbon fibers are regulated so as to agree with the structure according to an embodiment of the present invention. On the surface of a carbon fiber for a carbon fiber-reinforced plastic (hereinafter also referred to as "CFRP") which is used for generally widely circulated fishing rods or aircraft parts or the like, a coating film of a sizing agent or the like is formed, and therefore, such a carbon fiber is hardly dispersed in water at the time of sheet-forming. For that reason, a carbon fiber which is free from a coating film of a sizing agent or the like is chosen, or the sizing agent or the like is removed by thermally treating such a carbon fiber in a reducing atmosphere using a hydrocarbon gas generated from an organic material, hydrogen or carbon monoxide gas. Other than the reducing atmosphere, inert gas atmosphere using a nitrogen gas, a noble gas or the like can be also used. Incidentally, scraps generated in a process of manufacture of CFRP may also be used. Such a coating film can be removed by means of thermal treatment at about 500° C. or higher. Subsequently, it is preferable that the carbon fiber is regulated so as to have an average fiber length of less than about 1.0 mm. When the average fiber length of the carbon fiber is less than about 1.0 mm, as described above, the bulk density can be increased at the stage of a laminate of flocks (sheet-formed body); the generation of a wrinkle at the time of molding can be suppressed; the generation of a portion having weak strength can be suppressed; joining strength in the thickness direction of the structure is obtainable; and a hardly separable structure with high strength is obtainable. The carbon fiber having an average fiber length of less than about 1.0 mm can be obtained by pulverizing commercially available carbon fibers or scraps of cloths, strands or the like generated in a process of manufacture of CFRP. By pulverizing scraps of cloths, strands or the like of carbon fibers, a raw material of carbon fiber having an average fiber length of less than about 1.0 mm, which does not leave traces of cloths, strands or the like and which is easily utilized in the invention, can be obtained. Incidentally, pulverization can be achieved by means of dispersion in water and uniform pulverization using a mixer.

[Flock forming step (A)]

For forming flocks, it is desirable to use water as the liquid. This is because a large amount of the liquid is used, and therefore, not only water can be safely used as compared with organic solvents, but also the water is easily obtainable.

As the binder including a precursor component of the carbonaceous matrix (hereinafter also referred to as a "first binder"), any material is useful so far as it is insoluble in the foregoing liquid in which the carbon fibers are suspended and is carbonized. The first binder is preferably powdery in view of not forming void in the C/C composite material and preferably has a particle diameter of from about 3 to about 100 μm. As the first binder, for example, at least one selected from thermosetting resins such as phenol resins, furan resins and imide resins can be suitably utilized. As the phenol resin, for example, Bell Pearl (registered trademark), manufactured by Air Water Inc. can be suitably utilized. Bell Pearl is a powdery phenol resin, and a hydrophobic coating film is formed on the surface thereof. Thus, Bell Pearl keeps the powdery state without being dissolved even in water, so that it is able to aggregate together with the carbon fibers. An addition amount of the first binder is preferably from about 50 to about 200 parts by weight based on 100 parts by weight of the carbon fiber.

As the aggregating agent which is used in an embodiment of the present invention, any material is useful so far as it is able to aggregate the carbon fibers and the binder while utilizing a change of electric charges. Preferably, a material capable of regulating ζ-potential so as to fall about within ±10 mV is desirable. By lowering the ζ-potential, the repulsive force between the binder particles and the carbon fibers can be reduced, so that the aggregation easily occurs. For example, an inorganic aggregating agent material, an organic polymer aggregating agent and the like can be utilized as the aggregating agent. Specifically, Percol 292 (registered trademark), manufactured by Allied Colloid Company) that is an organic polymer aggregating agent and the like can be suitably utilized. When the flock is formed, the state of a slurry colored black with the carbon fibers changes into a state of a mixed liquid in which the black flock floats in a transparent liquid. The organic polymer aggregating agent can be preferably used in view of the fact that it has a large molecular weight, has a crosslinking action and is able to obtain a large flock.

An addition amount of the aggregating agent is preferably from about 0.01 to about 5 parts by weight based on 100 parts by weight of the carbon fibers and more preferably about 0.5 to about 1 parts by weight based on 100 parts by weight of the carbon fibers. When the addition amount of the aggregating agent falls within the foregoing range, a favorable flock which hardly collapses can be formed.

Also, although a size of the opening of the porous die face is not particularly limited, it is preferably from about 0.5 to about 10 mm, and more preferably from about 1 to about 3 mm. When the size of the opening of the porous die face is about 0.5 mm or more, the carbon fibers hardly causes clogging, whereby the passing resistance of water is not lily to becomes large. When the size of the opening of the porous die face is about 10 mm or less, since a suction force obtained by multiply an opening area by a negative pressure is not likely to be generated in the opening, a flock having such a size that it does not originally pass is hardly sucked and allowed to pass. The size of the flock is required to be equal to or more than the size of the opening of the porous die face used for filtration. Since the size of the flock has a distribution, when a flock having a large diameter is trapped by the die face, deposition of flocks on the porous die face starts. When an average diameter of the flock is largely lower than the size of the opening of the porous die face, the majority of flocks pass through the die face, so that the flocks cannot deposit on the die face. The average diameter of the flock in the mixed liquid is preferably from about 0.5 to about 10 mm, and more preferably from about 1 to about 5 mm. The size of the flock can be regulated by an amount of the aggregating agent, a type of the aggregating agent, aggregation time or strength of stirring.

It is preferable that a second binder is further added in the liquid for forming a flock. Since the foregoing first binder component is powdery at a sheet-forming stage, it is not able to keep the shape of the laminate of flocks (sheet-formed body). The second binder is a component which is added for the purpose of keeping the shape of the laminate of flocks (sheet-formed body) to be obtained subsequently until a subsequent calcination step. As the second binder, any material may be used so far as it is able to keep the shape of the laminate of flocks. Any material having an action to physically couple the carbon fibers and the first binder, and also the carbon fibers each other at a stage of forming the laminate of flocks may be used, and examples thereof include viscous liquids and organic fibers. As the viscous liquid, starch, latexes and the like can be suitably utilized. When the latex is mixed with water, it becomes cloudy to form a suspension. A droplet of the finely dispersed latex has an action to couple the carbon fibers with the first binder by an adhesive action. As the organic fiber, pulp or the like can be suitably utilized. The pulp has a good affinity with water and tangles with the carbon fibers to reveal an action to couple the carbon fibers with the first binder. In the case where a viscous liquid is used as the second binder, for example, as shown in FIG. 3C, in view of the fact that a second binder 7a intervenes between the carbon fiber 1 and the first binder 4, and a second binder 7b intervenes between the carbon fibers 1, the shape of the laminate 50 of flocks is kept.

Incidentally, in forming the flocks, the addition order of the foregoing carbon fibers, first binder, aggregating agent and second binder is not particularly limited, and they may be added in the liquid simultaneously or successively. However, from the viewpoint of forming the flocks uniformly and stably, it is preferable to undergo the preparation in the following order.

(a) The carbon fibers are added in water and dispersed with stirring. When stirring is too strong, bubbles are likely to be formed, and hence, such is not preferable. As stirring means, a propeller type, a paddle type or the like can be used. A stirring time of the carbon fibers is preferably about 3 minutes.

(b) Subsequently, the first binder is added, and stirring is continued until the first binder is dispersed. A stirring time is preferably from about 0.5 to about 5 minutes.

(c) Subsequently, the second binder is added, and stirring is continued until the second binder is dispersed. A stirring time is preferably from about 0.5 to about 5 minutes.

(d) Finally, the aggregating agent is added. When stirring is few, the aggregating agent is not mixed, whereas when stirring is excessive, the formed flocks are likely to be broken. A stirring time is regulated while confirming a degree of formation of flocks. The stirring time is preferably from about 20 to about 30 seconds.

[Forming step (B) of laminate of flocks]

The die 20 is dipped in the liquid containing the thus formed flocks 5. As shown in FIG. 3B, the die 20 is provided with the porous die face 21 having a substantially cylindrical shape and a vacuum chamber 22. The porous die face 21 is provided with the openings 21A. The vacuum chamber 22 is connected to a suction pump (not shown) by a conduit 23. In consequence, when the suction pump is actuated, air within the vacuum chamber 22 is discharged, thereby presenting a vacuum state. Then, the flocks 5 are suctioned on the side of the die 20. Since the size of the flock 5 is larger than the size of the opening 21A, the flocks 5 do not pass through the openings 21A but are laminated as a continuous layer on the surface of the porous dye surface 21 in the surface direction of the porous die face. On that occasion, the flocks 5 are laminated such that carbon fibers pierce the already formed laminate. The laminated flocks 5 become slightly flat from a spherical shape due to an influence of the suction force, and the longitudinal direction of the carbon fibers 1 within the flocks is oriented in parallel to the surface direction of the porous die face 21. On the other hand, the liquid passes through the openings 21A and is discharged out through the conduit. In this way, the laminate 50 of flocks (first molded body) can be formed.

As the porous die face 21, any material having plural openings through which the liquid is able to pass is useful, and examples thereof include nets, punching metals, woven fabrics and nonwoven fabrics. When using water as the liquid, the openings of the porous die face preferably has a diameter of about 1 to about 3 mm which water can easily pass through.

Incidentally, although the shape of the die is described later, a plane, a combination of plural planes, a three-dimensional curved surface, a combination of curved surfaces, a substantially cylinder having a flange, a substantially cone, a bottomed body, a substantially circular cylinder and so on can be properly chosen.

Also, at the time of suction filtration, any material may be used for undergoing the pressure reduction. In addition to air, other liquid can be suctioned together, and hence, a self-suction type centrifugal pump, an aspirator or the like can be suitably utilized.

Incidentally, as a method of filtration, in addition to the foregoing suction filtration, pressure filtration, centrifugal filtration or other method may be adopted. The pressure filtration is, for example, a method in which the outer surface side of the porous die face is pressurized by a pressurized gas to laminate flocks on the outer surface of the porous die face, thereby forming a laminate of flocks. The centrifugal filtration is, for example, a method in which a flock-containing mixed liquid is supplied into the inside of a die of a rotary body having a porous die face placed on the inner surface thereof, the rotary body is rotated to laminate flocks on the inner surface of the porous die face, thereby forming a laminate of flocks.

[Drying step]

Subsequently, in order to remove water remaining in the laminate of flocks obtained in the preceding step, it is preferable to dry the laminate together with the die. Drying is preferably performed at about 40° C. or higher for the purpose of removing water. Also, in order to prevent melting and curing of the first binder, it is preferable to perform drying at a temperature of not higher than a melting temperature of the first binder. For example, in the case of using Bell Pearl (registered trademark) as the first binder, taking into consideration the fact that the hydrophobic coating film is melted at about 70° C., drying is performed at not higher than about 60° C. while ventilating air, whereby water can be easily removed.

[Pressurizing step] (Molding step (C))

In the case where the structure has a plane, a pressurizing method by means of uniaxial molding can be utilized as a molding method. However, this method can be utilized only for a limited structure in which an upper die and a lower die are constituted on the both sides of a cavity. Therefore, when the structure has a three-dimensional shape, as shown in FIG. 3C, it is preferably that the laminate 50 of flocks is covered by a sealing film 24 and molded by applying heat and pressure using an autoclave 26. First all, air within the sealing film 24 is suctioned to draw a vacuum, and a pressure is then applied. A molding pressure is not limited but preferably about 1 MPa or more. When the molding pressure is about 1 MPa or more, it is possible prevent expansion of the sheet-formed body pressurized by a gas generated in curing reaction of a thermosetting resin. At that time, it is preferable to undergo molding while supporting the both sides (inner side or outer side) of the die 20 of the laminate 50 of flocks by a support material 25. Since there is a concern that the laminate of flocks is softened and deformable by heating, when the laminate is supported by the support material 25, deformation can be easily prevented from occurring. Different from that of the die 20 used in the forming step (B) of the laminate of flocks, the support material 25 as used herein is one not having a porous die face but having a smooth surface. Accordingly, as shown in FIG. 3D, the laminate 60 of a thin piece body precursor is obtained.

[Curing step]

Since the first binder is a thermosetting resin, it is preferable that after sufficiently increasing the pressure in the foregoing pressure molding step, the molded body is heated, thereby melting and curing the thermosetting resin contained in the flocks. According to this, the shape can be fixed in such a manner that the laminate 60 of a thin piece body precursor is not deformed. It is necessary to increase a curing temperature to the curing temperature of the thermosetting resin or higher. For example, in general, curing can be performed at about 150° C. or higher. The higher the temperature, the more advanced the curing is. In the case where the foregoing molding step is performed in an autoclave or other cases, so far as heating can be sufficiently performed in the molding step, the curing step can also be performed simultaneously with the molding step.

[Degreasing step]

In order to volatilize an organic component in the inside of the laminate 60 of a thin piece body precursor, it is preferable to perform degreasing prior to the calcination step. By way of this degreasing step, the first binder is carbonized, and the majority of the second binder is separated and vaporized. For that reason, the carbide derived from the first binder component is a material having a coupling action after the degreasing step. Any degree of temperature is adaptable for a temperature of the degreasing. In the case where pitch impregnation and resin impregnation are performed after the degreasing step, it is necessary to form pores, and hence, it is preferable to perform the degreasing at about 500° C. or higher. When the degreasing temperature is about 500° C. or higher, carbonization of the resin is likely to sufficiently proceeds, and pores having a sufficiently large size such that the resin or pitch is impregnated therein in the subsequent impregnation step can be formed. In order to prevent oxidation of the carbon fibers or binder from occurring, it is preferable to perform the degreasing in a reducing atmosphere using a hydrocarbon gas generated from an organic material, hydrogen or carbon monoxide gas. In addition to the reducing atmosphere, an inert gas atmosphere using a nitrogen gas, a noble gas or the like can also be applied.

[Impregnation step]

It is preferable to impregnate a resin, a pitch or the like in the inside of the pores of the laminate 60 of a thin piece body precursor after the degreasing, thereby realizing a high density. The laminate 60 of a thin piece body precursor after the degreasing is placed in the autoclave, and after drawing a vacuum, a liquid resin or pitch is introduced into the autoclave and dipped, followed by applying a pressure. The liquid resin may be a solution of the resin in water or an organic solvent, or may be a melted material obtained by applying heat. In the case of a solution, even when the use is repeated, polymerization hardly proceeds, so that the solution can be stably used. In the case of a pitch, the pitch is used after being converted into a liquid upon heating the autoclave at a melting point or higher.

After completion of the impregnation, similar to the foregoing degreasing step, degreasing is performed, whereby a molded body with a higher density can be obtained.

[Calcination step (D)]

By further applying heat to the laminate of a thin piece body precursor to perform calcination, the first binder is thoroughly carbonized, thereby forming a carbonaceous matrix. According to this, the thin piece body precursor becomes a thin piece body, whereby the C/C composite material structure 100 according to an embodiment of the present invention which is constituted of a laminate of thin piece bodies can be obtained.

In the calcination step, the support material thermally expands with an increase of the temperature, and the laminate 60 of a thin piece body precursor thermally shrinks. In order to avoid a stress to be caused due to a difference in thermal expansion generated in the calcination step, it is preferable that the support material 25 is removed from the laminate 60 of a thin piece body precursor and heated in a non-oxidizing atmosphere such as a reducing atmosphere or an inert atmosphere. A reducing atmosphere using a hydrocarbon gas generated from an organic material, hydrogen or carbon monoxide gas or an inert gas atmosphere using a nitrogen gas, a noble gas or the like can be used. A desired temperature of the calcination step is from about 1,500 to about 2,800° C. When the calcination temperature is about 1,500° C. or higher, a functional group in the C/C composite material, such as hydrogen, can be sufficiently removed. When a functional group such as hydrogen remains, a hydrocarbon gas or the like is likely to be generated at the time of using the C/C composite material structure. When a structure which is not calcined at a calcination temperature of about 1,500° C. or higher is used in a semiconductor manufacturing apparatus or the like, such a hydrocarbon gas is likely to be incorporated into a semiconductor, thereby lowering the purity. When the calcination temperature is not higher than about 2,800° C., the progress of crystallization of the C/C composite material can be suppressed, and the strength can be kept. A more desired range of the calcination temperature is from about 1,800 to about 2,500° C. It is preferable that the calcination is performed at a heating rate of about 500° C./hour.

According to an embodiment of the present invention, by forming the shape of the porous die face 21 into a shape along the shape of the desired structure, structures having various three-dimensional shapes in addition to the foregoing shape can be manufactured by means of integral molding. Additionally, it is possible to easily uniformly disperse carbon fibers, so that a structurally weak part is hardly formed even at a joining part of surfaces.

Incidentally, in order to increase the density, the impregnation step and the degreasing step may be repeated plural times prior to the calcination step.

(Average fiber length of carbon fibers)

Herein, an average fiber length $<L>$ of the carbon fibers may be measured by any method. So far as the carbon fibers are at a stage of raw material, the average fiber length is obtainable by directly measuring a dispersed carbon fiber powder by a scanning electron microscope or the like. As to a calculation method, the average fiber length of the carbon fibers can be determined by measuring all lengths $L_i$ of the carbon fibers existent in an arbitrary region and dividing them by a number n of the carbon fibers as expressed by the following equation (thickness and density of the carbon fibers do not take part in the average fiber length).

$$<L> = \Sigma L_i / n$$

Also, an average fiber length of the carbon fibers in a state where they are contained in the C/C composite material may be measured by any method. Though it is not easy to extract only the carbon fibers solely, the average fiber length of the carbon fibers can be measured using a method by, for example, a focused ion/electron beam system (FB-SEM) or the like. Specifically, an individual fiber length can be determined by confirming a three-dimensional disposition of fibers by SEM while processing the C/C composite material step-by-step from the surface using a focused ion/electron beam or the like.

(Embodiment 2)

A structure of Embodiment 2 of the present invention is described on the basis of FIGS. 4A to 4D.

Figure 4A:
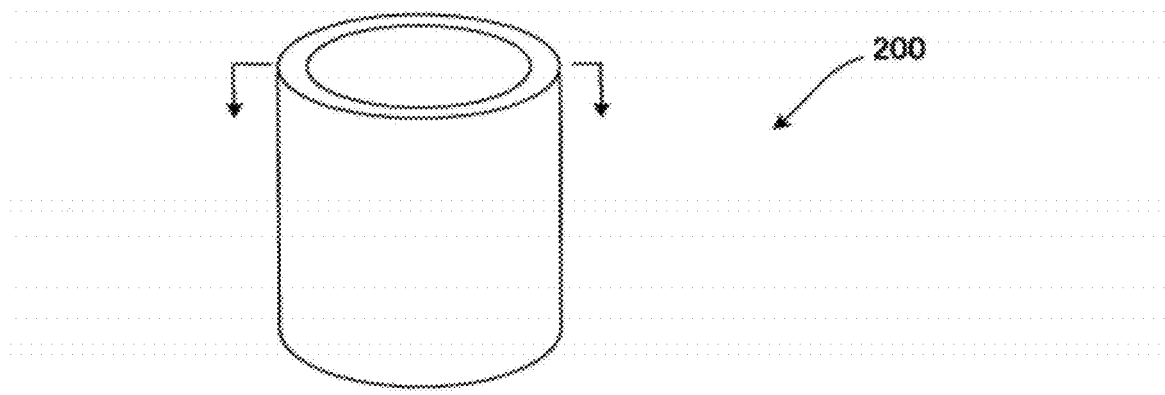
FIGS. 4A to 4D are views showing a structure of Embodiment 2, specifically.
Figures 4B, 4C, 4D:
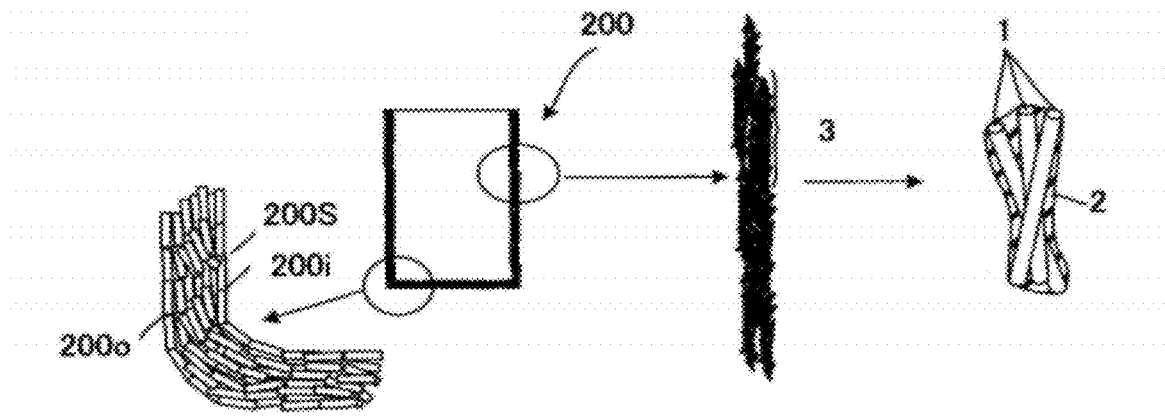

A structure 200 of Embodiment 2 is the same as the structure 100 of Embodiment 1, except for a point that it has a bottom. In order to manufacture the structure 200 of Embodiment 2, as shown in FIG. 5B, the flocks 5 are filtered using a die 30 having a porous die face 31 on each of a side surface and a bottom surface at the time of forming a laminate 50 of flocks. Also, as shown in FIG. 5C, a support material 35 in a pressurizing step is made bottomed. Other points are the same as those in the manufacturing method of Embodiment 1. The flocks 5 are laminated as a continuous layer in a surface direction of the porous die face 31. Then, as shown in FIG. 4B, the longitudinal direction of the carbon fibers 1 is oriented substantially in parallel to a direction of a surface 200S of the structure 200. According to this, in the resulting structure 200, the thin piece bodies are also oriented along the surface 200S of the structure 200 in a boundary region between the bottom surface and the side surface, and thus, the boundaries of the thin piece bodies are easily dispersed, thereby forming a uniform structure.

Incidentally, the surface direction of the structure as referred to herein means a principal surface constituting the structure and means that an edge surface is not included. A surface which after the calcination, is newly formed by means of polishing, boring or mechanical processing of the surface is not included. By taking a constitution in which the longitudinal direction of the carbon fibers is continuously oriented along the outer surface at the time of molding by the sheet-forming method, a C/C composite material structure having extremely high mechanical strength and excellent heat resistance can be provided.

EXAMPLE

The present invention is hereunder described in more detail with reference to the following Example and Comparative Example, but it should not be construed that the present invention is limited to these Examples.

(1) Carbon fiber preparation step

PAN based carbon fibers for CFRP having an average fiber diameter of 7 μm were prepared. Here, after a sizing agent coated on the fiber surface for the purpose of improving dispersibility into water was calcined in a reducing atmosphere at 550° C. and removed, the carbon fibers were dispersed in water and pulverized to an average fiber length of 150 μm using a mixer, followed by dehydration and drying. Then, the resulting carbon fibers were heated together with an organic material powder capable of generating a large amount of a hydrocarbon gas in a sealed vessel, and the inside of the sealed vessel was purged with a hydrocarbon gas generated from the organic material, thereby forming a reducing atmosphere.

(2) Flock forming step (a) The carbon fibers obtained in the preceding carbon fiber preparation step were thrown into water and dispersed while stirring. Stirring was performed for about 3 minutes.

(b) Subsequently, a phenol resin ("Bell Pearl" (registered trademark) S890, manufactured by Air Water Inc.) (200 parts by mass) was added as a first binder to 100 parts by mass of the carbon fibers, and the mixture was similarly stirred for one minute.

(c) Subsequently, a latex (5 parts by mass) was added as a second binder, and the mixture was similarly stirred for one minute.

(d) Furthermore, a cationic aggregating agent ("Percol" (registered trademark) 292, manufactured by Allied Colloid Company) (0.3 parts by mass) was added as an aggregating agent, and the mixture was stirred for 20 seconds, thereby forming flocks.

(3) Flock laminate forming step (sheet-forming step)

Water having flocks formed therein was sucked from the inside of a cylindrical die provided with a wire net having an opening of 1.0 mm on an outer surface thereof to laminate the flocks on the surface of the wire net, thereby forming a cylindrical laminate. Though the wire net had an opening of 1.0 mm, the carbon fibers formed the flocks, and hence, almost all of the carbon fibers did not pass through the net. After standing for a while as it was and removing water by means of a gravitational force, the resultant was dried by a dryer at 60° C.

(4) Molding step (formation of laminate of thin piece body precursor)

A wire net-free cylindrical die was inserted into the inside of the laminate obtained in the preceding step, and the surface was further covered by a sealing film. The resultant was placed in an autoclave and pressurized while applying heat at 150° C. A pressurizing pressure was set to 2 MPa.

(5) Curing step

Subsequent to the preceding step, the laminate was allowed to stand for 2 hours as it was under a maximum pressure in the autoclave. According to this step, the first binder (phenol resin) was cured.

(6) First degreasing step

The die of the laminate obtained in the preceding curing step was removed, and the resultant was heated in a reducing atmosphere furnace. Heating was performed at a temperature rise rate of 70° C./hour, and at a point of time when the temperature reached a maximum temperature of 550° C., the resulting laminate was kept for one hour and then allowed to stand for cooling to room temperature. Here, the reducing atmosphere is formed by heating the laminate with an organic material powder which can generate a large amount of hydrocarbon gas in a closed container, and purging the closed container with the hydrocarbon gas from the organic material.

(7) (Impregnation step)

In the case where a desired bulk density is not obtained until the first degreasing step, impregnation is further performed.

In this Example, the laminate after degreasing was placed in an autoclave heated at 200° C., and after drawing a vacuum, a pitch having a softening point of about 80° C. was allowed to flow in. The laminate was pressurized at 4 MPa, thereby impregnating the pitch thereinto.

(8) (Second degreasing step)

The laminate having gone through the impregnation step is again subjected to degreasing. The degreasing was performed under a condition the same as the condition in the first degreasing step of (6).

(9) Calcination Step

The laminate having been subjected to the impregnation was finally calcined. The laminate was heated at a temperature rise rate of 150° C./hour in a reducing atmosphere, and at a point of time when the temperature reached a maximum temperature of 2,000° C., the resulting laminate was kept for 15 seconds and then allowed to stand for cooling to room temperature. The reducing atmosphere is formed by a mixed gas of hydrogen, carbon monoxide gas and hydrocarbon gas generated by heating while putting the laminate in carbon powders in a state of preventing oxide from the outside. According to this calcination step, a matrix was formed from the first binder. According to the presence of the matrix, a bonding force of carbon fibers is strengthened, and strength can be revealed. In this way, there was obtained a cylindrical structure having an inner diameter of 1,000 mm, a height of 1,000 mm, a thickness of 25 mm.

Comparative Example

A structure of comparative example configured by C/C composite material is manufactured. First of all, PAN based carbon fibers were cut into a size of 30 mm, thereby forming a sheet-like felt. Subsequently, the felt was dipped in a methanol solution of a phenol resin, from which was then formed a carbon fiber sheet prepreg having a thickness of 3 mm by using a roll press. The thus formed carbon fiber sheet prepreg was allowed to revolve around a mandrel, thereby forming a molded body having felt-like sheets laminated thereon.

Subsequently, the resulting molded body was kept at 150° C. to cure the phenol resin, thereby fixing the shape.

Subsequently, degreasing, impregnation, degreasing and calcination were performed in the same manner as that in Example, thereby obtaining a cylindrical structure having an inner diameter of 600 mm, a height of 600 mm and a thickness of 25 mm.

<Evaluation of physical properties>
Peeling Test

In the structure obtained in Example, thin piece bodies oriented in a surface direction of the structure were formed; and when cuts were put from the end in a parallel direction to the surface of the structure by using a knife and peeled away, the thin piece bodies were not easily separated.

In the structure obtained in Comparative Example, cuts were put from the end in which a layer structure of annual rings was seen in a parallel direction to the surface of the structure by using a knife and peeled away. As a result, the layer of annual rings was easily separated.

Bulk density and bending strength

Figure 11:
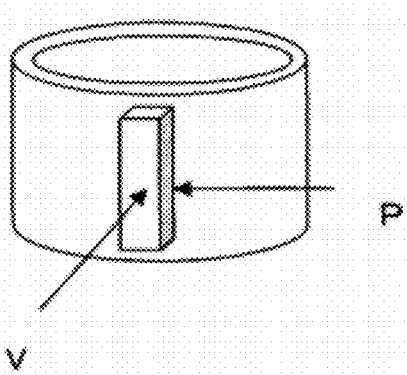
FIG. 11 is a schematic view showing a cut-out direction and a bending test direction of a sample for measuring physical properties of a carbon fiber structure of each of Example and Comparative Example.

Two samples for measuring physical properties of a rectangular parallelepiped, each of which was longer in a height direction of the cylinder, were obtained from the structure obtained in each of Example and Comparative Example. The sample for measuring physical properties was measured with respect to a bulk density and a bending strength. The bending strength was measured by performing a three-point bending test using an autograph (AG-IS Model: 0 to 5 kN), manufactured by Shimadzu Corporation. FIG. 11 is a schematic view showing a method of cutting out a sample for measuring physical properties and a test direction of a three-point bending test. The three-point bending test was performed from two directions of a vertical direction (laminating direction of thin piece body) V and a parallel direction P relative to a surface direction of the structure. With respect to the bulk density, a volume and a mass were determined, respectively. The results of the bulk density and the bending strength are shown in Table 1.

TABLE 1

|  | Bulk density (g/cm$^3$) | Bending strength in the vertical direction*[1] (MPa) | Bending strength in the parallel direction*[2] (MPa) |
|---|---|---|---|
| Example | 1.28 | 69.0 | 75.7 |
| Comparative Example | 1.35 | 19.6 | 47.2 |

*[1]Three-point bending test from the surface direction and the vertical direction of the structure
*[2]Three-point bending test from the surface direction and the parallel direction of the structure As shown in Table 1, the structure obtained in the Example is constituted through lamination of the thin piece bodies; and furthermore, due to the presence of the carbon fiber component connecting the thin piece bodies adjoining in the thickness direction (laminating direction of the thin piece body) to each other, a homogenous structure was obtained, and a substantially equal three-point bending strength was obtained in any of the vertical direction or parallel direction to the surface direction of the structure.

In the structure obtained in the Comparative Example, the strength in the vertical direction is significantly lowered as compared with that in the parallel direction to the surface direction of the structure. In the three-point bending test in the vertical direction to the surface direction of the structure, the structure was broken in such a manner that the laminated sheet was separated.

In the Comparative Example, the structure is constituted through lamination of the sheets, and a carbon fiber component connecting the sheets to each other upon being oriented in the thickness direction is not present. Thus, a joining force between the sheets was weak, and in the three-point bending test in the vertical direction to the surface direction of the structure, a remarkable lowering of the strength was found. Also, even in the three-point bending test in the parallel direction to the surface direction of the structure, separation of the sheet was found, and only low strength was obtained as compared with that in Example.

Observation of surface and section

The surface and section of the structure obtained in each of Example and Comparative Example were observed by various photographs.

Preparation method of samples for polarizing microscopic and scanning electron microscopic (SEM) photographs A sample of a C/C composite material was embedded in an epoxy resin, and a section was fabricated by means of a mechanical polishing method, followed by performing a flat milling treatment (at 45° for 3 minutes). A section having been subjected to Pt—Pd sputtering was observed by FE-SEM and a polarizing microscope. Here, the epoxy resin is one used for fixing a sample for cutting out a flat surface from a soft sample, an easily deformable sample, a fine sample or the like. For example, though an end surface of a powder, a section of a fiber or the like is in general hardly subjected to section processing, it becomes possible to achieve the observation by fixing with a fixing agent such as an epoxy resin in such a way.

Figure 6A:
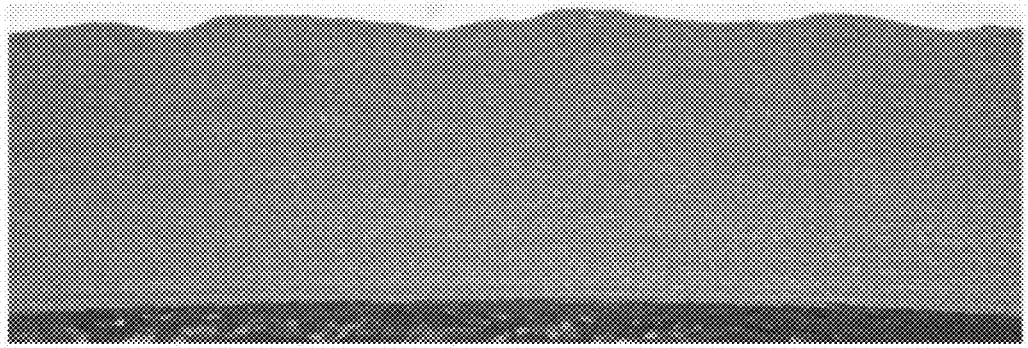
FIG. 6A is a photograph of a section of a structure of Example.
Figure 6B:
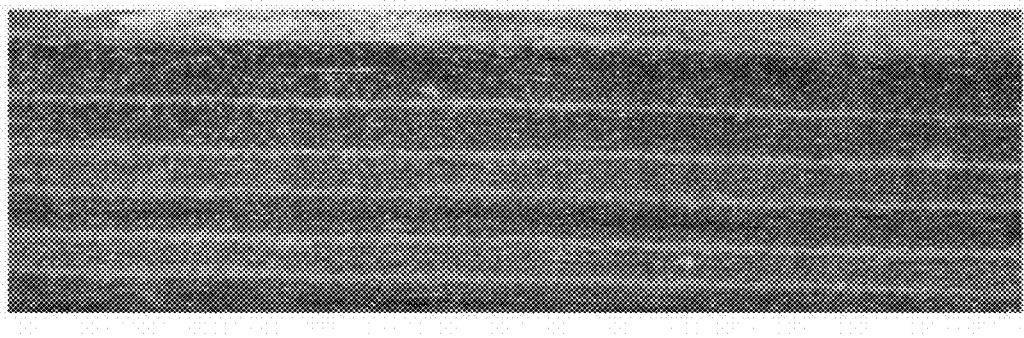
FIG. 6B is a photograph of a section of a structure of Comparative Example.

(Analysis apparatus and measurement condition)
[Flat Milling]
Apparatus: Hitachi, E-3200
Output: 5 kV, 0.5 mA
[FE-SEM]
Apparatus: JEOL, JSM-7001F
Accelerating voltage: 5 kV
Observation image: Secondary electron image
[Polarizing microscope]
Apparatus: manufactured by Nikon FIG. 6A is a photograph of a section of the structure of Example, and FIG. 6B is a photograph of a section of the structure of Comparative Example. The vertical direction in the photograph is a thickness direction of the structure (laminating direction), and the horizontal direction in the photograph is a surface direction. In the structure of Example, it is noted that a uniform structure in which thin piece bodies oriented in a surface direction of the structure are formed, and boundaries of the thin piece bodies are dispersed is formed. In the structure of Comparative Example, it is noted that a layer structure of annual rings is formed.

Figure 7A:
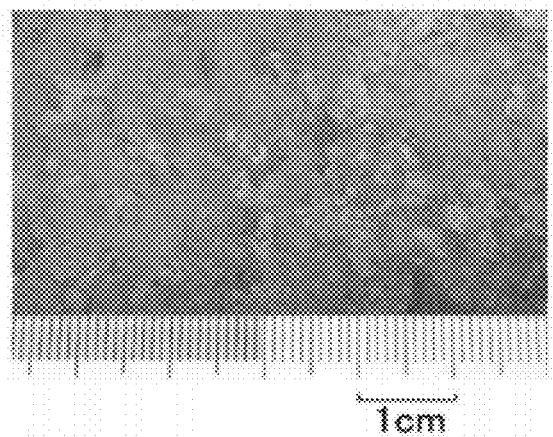
FIG. 7A is an enlarged photograph of the surface of a structure of Example.
Figure 7B:
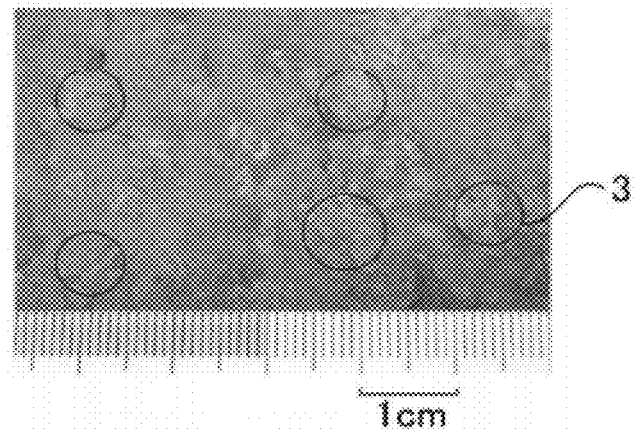
FIG. 7B is a photograph of thin piece bodies observed on the surface of a structure of Example.
Figure 7C:
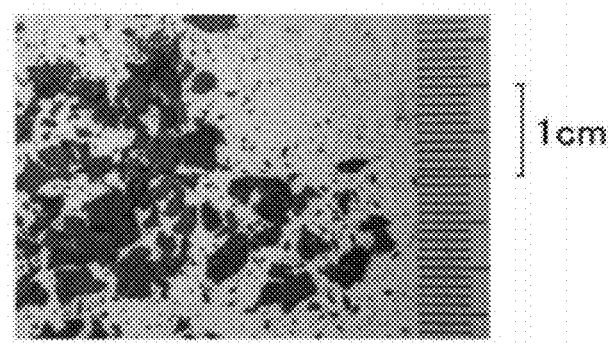
FIG. 7C is a photograph of thin piece bodies separated from the surface of a structure of Example.

FIG. 7A is a photograph of an inner surface of the cylindrical structure of Example. FIG. 7B shows thin piece bodies observed in the photograph of FIG. 7A. A solid line region in FIG. 7B shows each of the thin piece bodies 3. FIG. 7C shows a photograph of the thin piece bodies separated from the surface of FIG. 11A. Since the inner surface is molded by using the support material 25, a flat surface which is free from large irregularities is obtained. However, it can be confirmed that thin piece bodies oriented in parallel to the surface direction as formed from flocks are exposed on the surface. Such thin piece bodies can be gradually peeled away from a site where an end thereof is exposed because the constituting carbon fibers are oriented in parallel to the surface direction; however, the thin piece bodies are merely separated one by one, and separation reaching the whole of the carbon fiber structure does not occur. Such separation can also be similarly confirmed on the fracture surface formed by breaking the carbon fiber structure in a layer direction thereof.

Figure 8A:
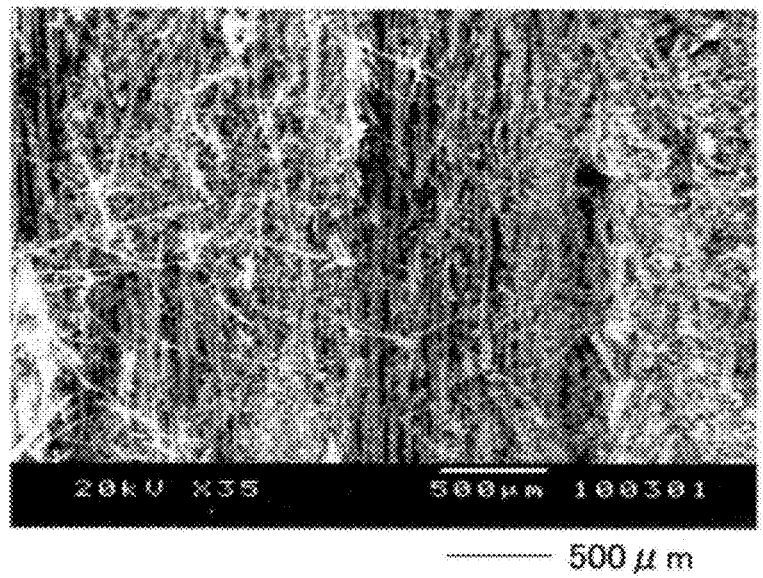
FIG. 8A is a scanning electron microscopic photograph of a section in which a felt is wound and laminated around a mandrel in a sheet winding method of Comparative Example.
Figure 8B:
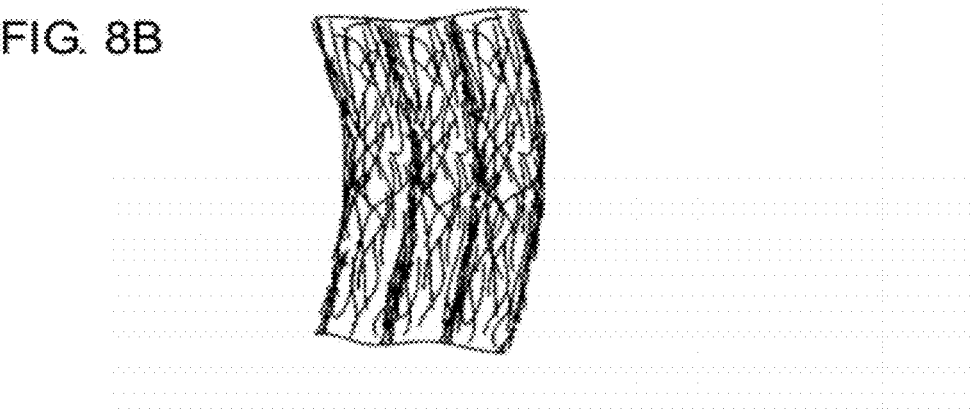
FIG. 8B is a schematic view of FIG. 8A.

FIG. 8A shows an SEM photograph obtained by enlarging a section of the structure of Comparative Example, and FIG.

8B shows a schematic view thereof. It can be confirmed that the fibers in a sheet interface part are strongly oriented in parallel along the boundary.

Figure 9A:
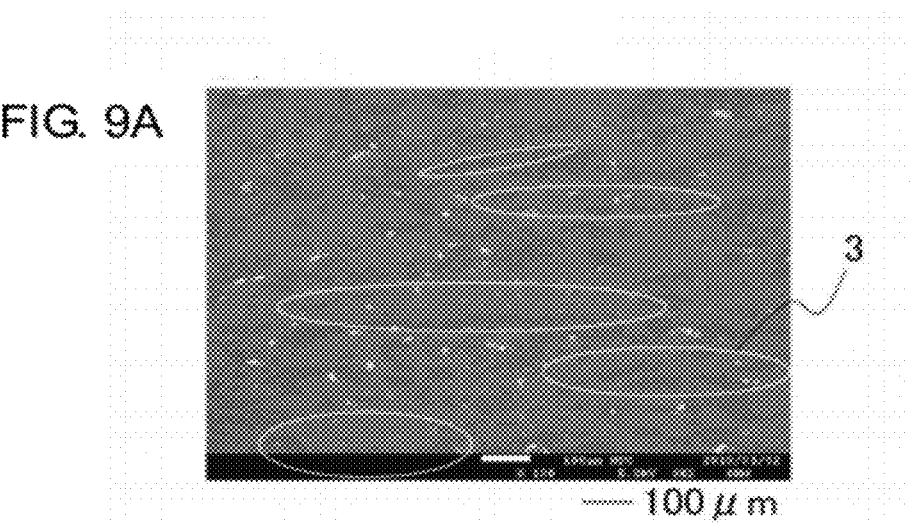
FIGS. 9A to 9C are scanning electron microscopic photographs of a section of a structure of Example, specifically.
Figure 9B:
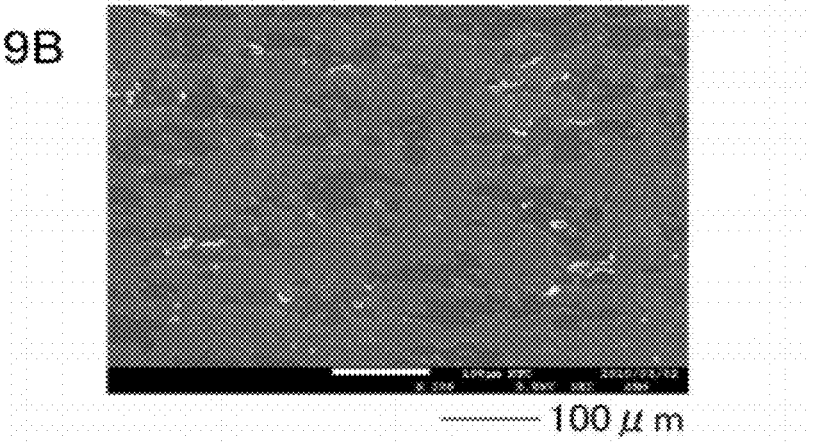
Figure 9C:
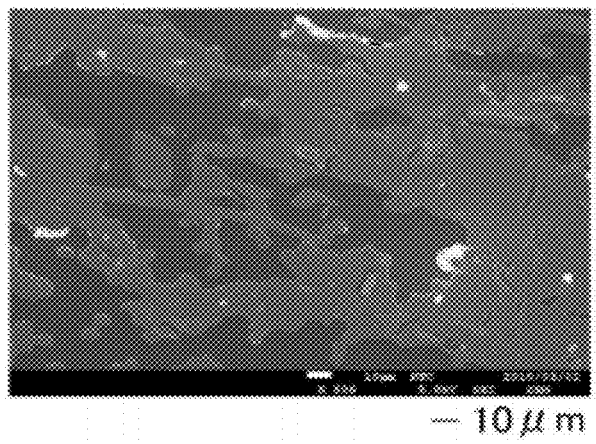

FIGS. 9A to 9C are SEM photographs of a section of the structure of Example. The vertical direction in the photograph is a thickness direction of the structure (laminating direction of thin piece bodies), and the horizontal direction in the photograph is a surface direction. FIG. 9A is an SEM photograph of the structure of Example with a magnification of 100; FIG. 9B is an SEM photograph of the structure of Example with a magnification of 200; and FIG. 9C is an SEM photograph of the structure of Example with a magnification of 500. FIG. 9A shows thin piece bodies observed in the SEM photograph of the section. A solid line region in FIG. 9A shows each of the thin piece bodies 3. FIG. 9B is a more enlarged SEM photograph of the thin piece body portion of FIG. 9A. FIG. 9C is a still more enlarged SEM photograph of the thin piece body portion of FIG. 9B. As shown in FIG. 9A, it can be confirmed that the thin piece bodies are laminated while being oriented in parallel to the surface direction of the carbon fiber structure.

Figure 10A:
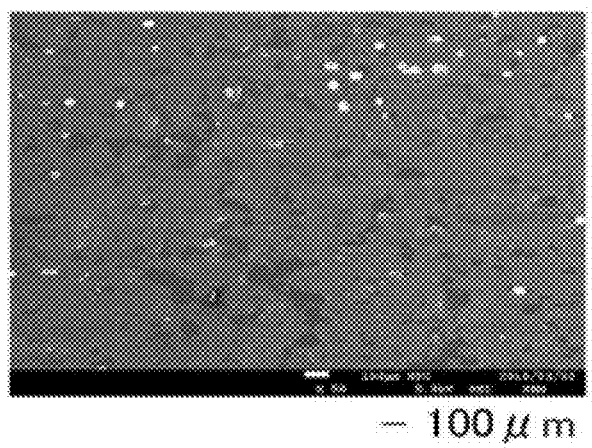
FIGS. 10A to 10C are scanning electron microscopic photographs of a section of a structure of Comparative Example, specifically.
Figure 10B:
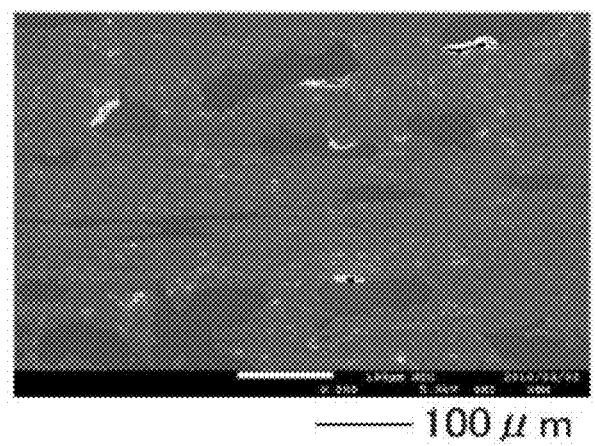
Figure 10C:
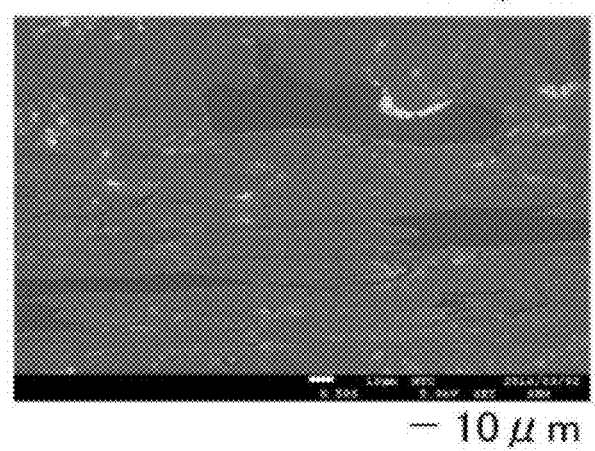

FIGS. 10A to 10C are SEM photographs of a section of the structure of Comparative Example. The vertical direction in the photograph is a thickness direction of the structure (laminating direction of thin piece bodies), and the horizontal direction in the photograph is a surface direction. FIG. 10A is an SEM photograph of the structure of Comparative Example with a magnification of 50; FIG. 10B is an SEM photograph of the structure of Comparative Example with a magnification of 200; and FIG. 10C is an SEM photograph of the structure of Comparative Example with a magnification of 500. FIG. 10B is a more enlarged SEM photograph of FIG. 10A. FIG. 10C is a still more enlarged SEM photograph of FIG. 10A. As is confirmed by FIG. 10B or 10C, a region where the carbon fibers are strongly oriented in parallel in the surface direction of the carbon fiber structure is present, and it is confirmed that in this region, connection of fibers in the thickness direction is not substantially formed. For that reason, it is noted that in Comparative Example, the region where the fibers are strongly oriented responsive to a vertical tension in the photograph of FIG. 10B or 10C becomes a defect.

Figure 12A:
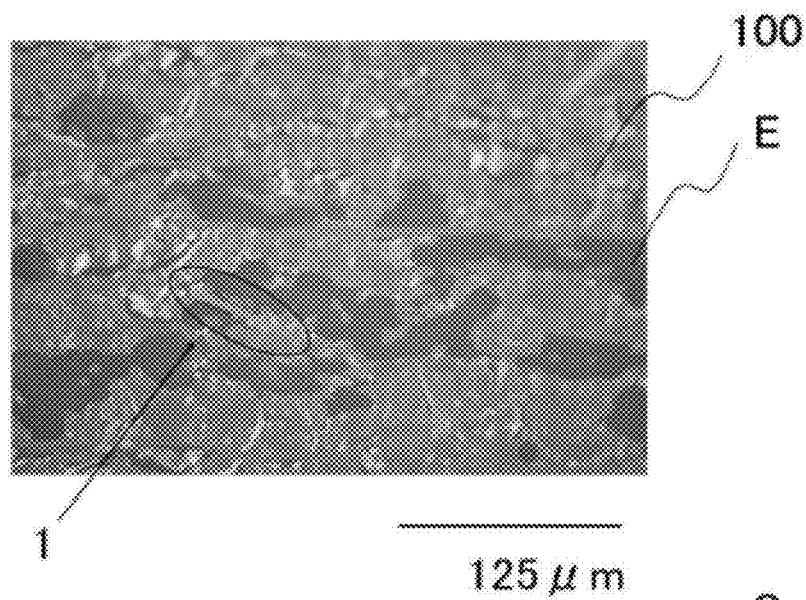
FIG. 12A is a polarizing microscopic photograph of a section of a structure of Example.
Figure 12B:
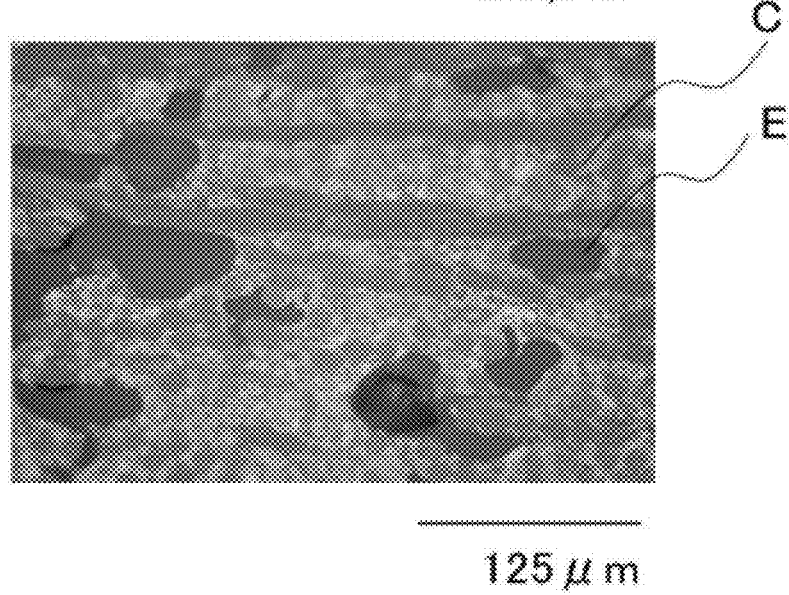
FIG. 12B is a polarizing microscopic photograph of a section of a structure of Comparative Example.
Figures 13A, 13B:
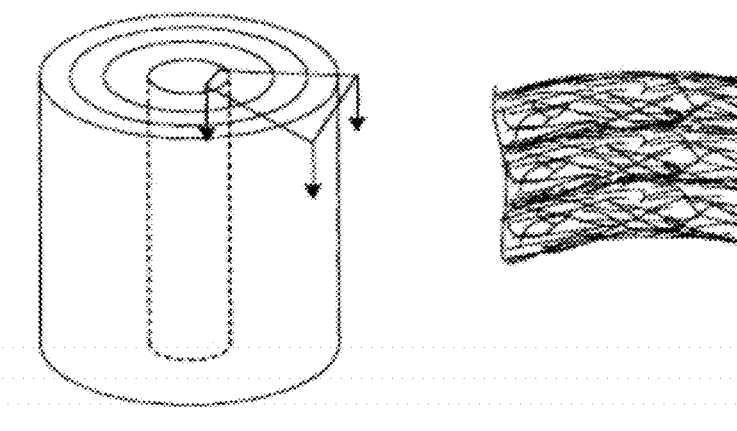
FIGS. 13A and 13B are views showing a structure of Comparative Example, specifically.

FIG. 12A is a polarizing microscopic photograph of a section of the structure of Example. The vertical direction in the photograph is a thickness direction of the structure (laminating direction of the thin piece body), and the horizontal direction in the photograph is a surface direction. FIG. 12B is an SEM photograph of a section of the structure of Comparative Example. The vertical direction in the photograph is a thickness direction of the structure (laminating direction of the sheet), and the horizontal direction in the photograph is a surface direction. In a polarizing microscope, a different color is observed depending upon the orientation direction of a crystal, and hence, the fibers and the matrix can be easily distinguished from each other. The fibers are observed in a substantially linear shape, a substantially oval shape or a substantially circular shape depending upon a relation with the observing surface. Also, a site which is deeply gray and is free light and shade in FIGS. 12A and 12B is an epoxy resin E used as a sealing resin, and other regions are a carbon fiber structure (thin piece body including the matrix and the carbon fibers) in FIG. 12A and a carbon fiber structure C in FIG. 12B, respectively.

In a region surrounded by a solid line in FIG. 12A, a carbon fiber component 1 connecting the thin piece bodies adjoining in the vertical direction (laminating direction of the thin piece body) to each other, could be confirmed. On the other hand, in FIG. 12B, such a carbon fiber component could not be confirmed.

In a polarizing microscopic photograph like shown in FIG. 12A, in order that carbon fibers connecting thin piece bodies to each other may be observed, not only the carbon fibers must be present on the observing surface, but the longitudinal direction of the carbon fibers must be contained in the observed surface. In FIG. 12A, a carbon fiber component connecting the thin piece bodies adjoining in the vertical direction (laminating direction of the thin piece body) in the photograph to each other could be confirmed, and therefore, it may be said that many other carbon fiber components connecting the thin piece bodies adjoining in the vertical direction (laminating direction of the thin piece body) to each other, which cannot be observed, are also present.

Since the carbon fiber structure according to an embodiment of the present invention has high strength, high heat resistance and high chemical stability, it is useful for silicon single crystal pull-up apparatuses, compound semiconductor crystal pull-up apparatuses, manufacturing apparatuses of silicon for solar cell (for example, silicon thin film forming apparatuses, manufacturing apparatuses of silicon ingot, etc.), members to be used at a high temperature, such as apparatus parts in the atomic energy, nuclear fusion or metallurgy field or the like, fields required to keep high strength against a temperature change, such as space parts and aerospace parts, and so on.

What is claimed is:

1. A carbon fiber structure comprising a carbon fiber-reinforced carbon composite material including carbon fibers and a carbonaceous matrix,
    wherein the carbon fibers are substantially linear fibers,
    wherein the carbon fibers form piece bodies in which a longitudinal direction of the carbon fibers is oriented in parallel to a surface direction of the carbon fiber structure within the carbonaceous matrix,
    wherein the carbon fiber structure is a laminate having the piece bodies laminated therein, and
    wherein the carbon fibers have an average fiber length of less than about 1.0 mm.

2. The carbon fiber structure according to claim 1,
    wherein a part of the carbon fibers has a component connecting the piece bodies adjoining in a laminating direction of the piece body to each other.

3. The carbon fiber structure according to claim 1,
    wherein the piece bodies are disposed such that ends of the piece bodies that are adjacent to each other in a laminating direction are dispersed in the laminating direction.

4. The carbon fiber structure according to claim 1,
    wherein an orienting component of the carbon fibers in a thickness direction of the carbon fiber structure that is perpendicular to the surface direction of the carbon fiber structure is continuously present in the thickness direction.

5. The carbon fiber structure according to claim 1,
    wherein the carbon fiber structure has a bulk density of about 1.2 g/cm$^3$ or more.

6. The carbon fiber structure according to claim 1,
    wherein an average major axis diameter of the piece bodies ranges from about 1 mm to about 10 mm.

7. The carbon fiber structure according to claim 6,
    wherein the average major axis diameter of the piece bodies ranges from about 2 mm to about 5 mm.

8. The carbon fiber structure according to claim 6,
    wherein an average thickness of the piece bodies ranges from about 0.05 mm to about 1.0 mm.

9. The carbon fiber structure according to claim 8,
wherein the average thickness of the piece bodies ranges from about 0.1 mm to about 0.5 mm.

10. The carbon fiber structure according to claim 1,
wherein the carbon fibers are polyacrylonitrile based carbon fibers.

11. The carbon fiber structure according to claim 1,
wherein an average fiber diameter of the carbon fibers ranges from about 1 μm to about 20 μm.

12. The carbon fiber structure according to claim 1,
wherein an aspect ratio of the carbon fibers ranges from about 10 to about 1,000.

13. The carbon fiber structure according to claim 1,
wherein the carbon fiber structure has a curved shape with a thickness of about 20 mm or more.

14. The carbon fiber structure according to claim 1,
wherein the carbon fiber structure has a bottom face.

15. A carbon fiber structure comprising a carbon fiber-reinforced carbon composite material including carbon fibers and a carbonaceous matrix,
wherein the carbon fibers are substantially linear fibers,
wherein the carbon fibers form piece bodies in which a longitudinal direction of the carbon fibers is oriented in parallel to a surface direction of the carbon fiber structure within the carbonaceous matrix,
wherein the carbon fiber structure is a laminate having the piece bodies laminated therein, and
wherein the average fiber length of the carbon fibers ranges from about 0.05 mm to about 0.5 mm.

\* \* \* \* \*